June 8, 1965 W. F. SIMON 3,188,616

TRANSISTOR COMPENSATING CIRCUIT FOR MAGNETIC RECORDING HEAD

Filed Aug. 17, 1961

INVENTOR
WILLIAM F. SIMON

BY William G. Miller Jr.
AGENT 3,188,616
Patented June 8, 1965

3,188,616

TRANSISTOR COMPENSATING CIRCUIT FOR MAGNETIC RECORDING HEAD

William F. Simon, Oreland, Pa., assignor to Sperry Rand Corporation, New York, N.Y., a corporation of Delaware Filed Aug. 17, 1961, Ser. No. 132,159
1 Claim. (Cl. 340—174.1)

This invention relates to compensating circuits for preventing excessive dissipation in drive circuits for reactive loads while at the same time preventing adverse effects upon the switching time of such a circuit. More particularly, this invention is concerned with compensating circuits for preventing excessive power dissipation in transistor drive circuits for digital recording magnetic heads while at the same time allowing optimum switching speeds for such drive circuits.

In the past, transistorized drive circuits for providing the current to the winding of a magnetic head, as is necessary to effect a writing on an associated magnetic medium traveling past the gap in the magnetic head, have been subjected to excessive power dissipation under conditions which involve periods of conduction longer than the electrical time constant of the magnetic head. In order to prevent this excessive dissipation one practice used in the past utilized a resistance inserted in series between the drive circuit and the winding of the magnetic head to limit the current therethrough. Such an approach, however, causes a decrease in the switching speed of the circuit by further limiting the initial voltage across the winding as compared with the voltage which could be obtained without such a limiting resistor.

Another approach which has been used in solving this problem involves the reduction of the voltage output of the driving stage to thereby limit its dissipation. This approach likewise reduces the switching speed of the circuit.

It is, therefore, an object of this invention to provide a compensating network for preventing excessive dissipation in transistor circuits driving inductor loads without adversely affecting the switching speed of the circuit.

It is a further object of this invention to provide a compensating circuit allowing for a maximum possible switching time in a transistor drive for a magnetic recording head.

It is another object of this invention to provide a compensating circuit in series between a transistor driving circuit and a magnetic recording head which would be effective to cause the total load to appear to be a purely resistive load.

A further object of this invention is the provision of an improved circuit for effecting a writing of digital information on a recording medium by means of a magnetic recording head.

A further object of this invention is the provision of a compensating circuit connected in series between a transistor drive circuit and a magnetic recording head winding and having a time constant such that essentially constant current will be driven through the magnetic head by the drive circuit at all frequencies.

In carrying out this invention there is provided a compensating circuit including a capacitor and a resistor in shunt connection. This compensating circuit is effectively connected in series between a transistor drive circuit and the inductive load provided by a magnetic head winding. The capacitor and resistor are of such a value that their time constant is substantially equal to the time constant of the head circuit including the magnetic head inductance, its resistive losses, and any external damping, with the resistor being of such value that it provides a substantially matching impedance as a termination for the drive circuit connection.

The foregoing objects, advantages and construction of the present invention may be best understood from the following description and the accompanying drawings in which like reference numerals refer to like parts and in which.

Figure 1:
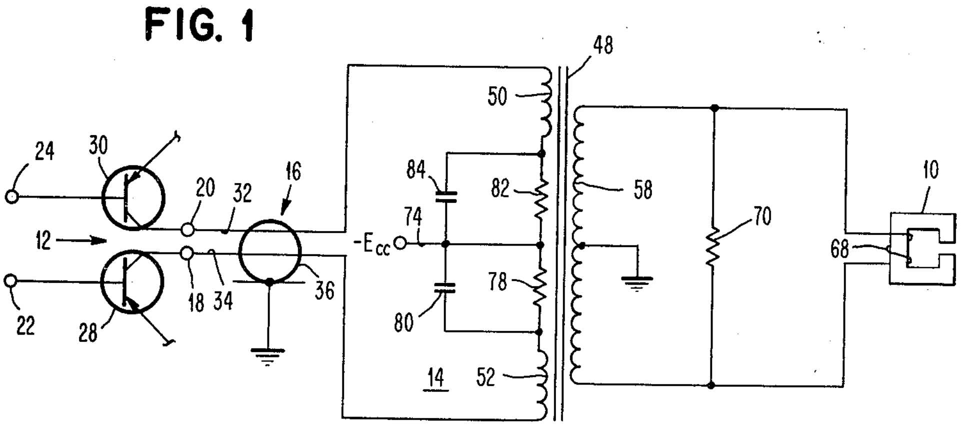
FIGURE 1 is a schematic diagram illustrating the novel compensating circuits.

In the arrangement shown in FIGURE 1, the magnetic head 10 is connected to a transistor drive circuit 12 by way of a coupling circuit 14 and a cable 16. The transistor drive circuit 12 is only partially shown as this circuit may be any of the known transistor drive circuits which are capable of selectively providing a pulse output at terminal 18 or terminal 20 in dependence upon the presence of input pulses at the corresponding input terminals 22 and 24. These input pulses may represent different binary states, and for example, as may be the case in a digital computer, a pulse input at terminal 22 of such polarity and magnitude as to make transistor 28 conductive may represent a binary ONE while a pulse input at terminal 24 such as to make transistor 30 conductive may represent a binary ZERO.

The magnetic head 10 may be a magnetic head associated with a recording drum or magnetic tape or other recording medium and thus could be located at a sufficient distance from the driving circuit 12 to make necessary a connecting cable 16 which as shown in FIGURE 1 may consist of a cable having two conductors 32 and 34 surrounded by a grounded shield 36.

The coupling circuit 14 is shown with two sides corresponding to the two sides of the transistor driving circuit 12. The coupling circuit 14 includes transformer 48 which has primary windings 50 and 52 each associated with a different side of the coupling circuit 14. The transformer 48 also includes a secondary 58 which is coupled to winding 68 of head 10 and includes a grounded center tap to reduce noise pickup. The transformer 48 is essentially to provide a means for establishing proper impedance for terminating cable 16 in a manner to prevent reflections on cable 16.

Winding 68 of head 10 is shunted by resistor 70 which is effectively a damping resistor such that variations of resistive losses of the magnetic head are made less significant by the presence of an external invariant lossy element. The turns ratio of transformer 48, and the total resistive loss of head 10 and damping resistor 70 are of such values that the impedance reflected in windings 50 and 52 taken together is an impedance which is substantially equal to the characteristic impedance of cable 16.

Coupling circuits of this type as used in the past would normally include the circuits, elements and connections as above-described with the primary windings 50 and 52 being connected directly to a common return lead 74. However, applicant's invention provides an improvement over this prior arrangement which is accomplished by the insertion of shunt connected resistor 78 and capacitor 80 on one side of the compensating circuit and shunt connected resistor 82 and capacitor 84 on the other side. The shunt combinations of these resistors and capacitors is interposed in series between the common return lead 74 which may be a potential source $-E_{cc}$ and the corresponding primary winding 50 and 52.

Figure 2:
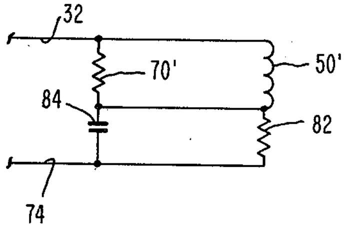
FIGURE 2 is a schematic drawing showing an equivalent circuit for a portion of FIGURE 1.

For purposes of illustrating this invention one side of the coupling circuit 14 and the connected load across the secondary 58 of transformer 48 is shown in the form of an equivalent circuit as FIGURE 2. In FIGURE 2 the resistive part of the impedance seen across primary 50 is shown as resistor 70' and essentially represents the value of resistor 70 in parallel with resistive losses of head 68 of FIGURE 1 as they are effectively reflected to primary 50.

The effective inductance seen across the primary is shown as 50'. It will be evident that the resistor 70' and the inductor 50' of the equivalent circuit of FIGURE 2 are essentially the only elements that would have been present in the prior art circuit. In such a circuit if we consider that the driving circuit applies a fixed potential across it in response to information pulses, it will be evident that initially the current would flow mostly through resistor 70' and the current would thereafter continue to change until the inductor 50' appeared to be a short circuit in which case the current would be at a maximum. Under such conditions which might be considered steady state conditions or the limit condition representing a high duty cycle, it is evident that a transistor driver coupled to line 32 might well be required to dissipate an excessive amount of power. Since transistors are by nature easily destroyed by excessive power dissipation, the transistor might easily be burned out by such a steady state condition. In response to pulses, conditions approaching the steady state conditions mentioned above might occur due to a failure in the drive circuit and such a failure would then result in a burned out transistor. In situations where occasional high duty cycles or failure conditions must be taken into account excessive dissipation in transistor driver elements has been avoided in the past by reducing the voltage applied by the driving circuit to allow a margin of safety on the dissipation in the transistor driver to take care of such high duty cycle or failure conditions. Alternatively, a series resistance has been included to provide for limiting the current in the circuit to a safe value and thus prevent burn out of the transistor driver. Since these approaches result in an increase in the switching time of the circuit by limiting the initial rate of change of current flow they are not a satisfactory solution to the problem.

In FIGURE 2 which shows the equivalent circuit incorporating the present novel concept the capacitor 84 is provided in shunt connection with resistor 82 with this shunt combination being in series with the shunt combination of resistor 70' and inductor 50'. The initial current flow between wire 32 and lead 74 will be through resistor 70' and capacitor 84 with negligible initial potential across capacitor 84. The time constant of shunt combination of the capacitor 84 and resistor 82 are substantially matched to the time constant of the shunt combination of resistor 70' and inductor 50' so that as the current in inductor 50' builds up, the potential across capacitor 80 will likewise build up causing a shift in current flow to inductor 50' and resistor 82. Since the resistor 70' is essentially equal in value to resistor 82 and in view of the relationship of the time constants as above-mentioned, the circuit between wire 32 and lead 74 will appear to be a purely resistive circuit having a value equal to that of resistor 70' which may be so selected by selecting the values of resistor 70 and of the turns ratio of transformer 48 in FIGURE 1 that it provides the proper terminating resistance for matching the characteristic impedance of cable 16. The circuit of FIGURE 1 can therefore utilize a maximum voltage between wire 32 and lead 74 without any intervening series resistors for limiting the current flow and thus obtain an optimum switching speed in the circuit while preventing excessive power dissipation in the driving transistors.

While there is described above the equivalent circuit of FIGURE 2 which corresponds to that one side of the coupling circuit 14 that responds to signals representing binary ZEROS at terminal 24 to produce a magnetizing current in one direction in winding 68 of head 10, the other side of the coupling circuit 14 is similarly constructed and responds to signals representing binary ONES at terminal 22 to thereby cause a magnetizing current in winding 68 in a direction opposite to that for a binary ZERO. There can thus be recorded magnetic spots on any adjacent record medium which spots will have opposite polarities to represent binary ONES and ZEROS. It is, of course, possible to utilize other encoding techniques such as phase modulation in the circuit of FIGURE 1.

It will be evident to those skilled in the art that the present invention is equally applicable to single ended circuits. In addition, it will be evident that the coupling circuit of FIGURE 14 could be utilized as an input circuit in the case where the wires 32 and 34 are switched to couple to a reading amplifier when head 10 is utilized to read magnetically recorded data. In such an arrangement the resistors 78 and 82 and capacitors 80 and 84 would be effective in preventing waveform distortion in the reading operation despite variations of amplifier input impedance for they cause the circuit to appear purely resistive.

What I claim is:

In a circuit for connecting a double ended transistor drive circuit to a recording coil of a magnetic recording head the combination of a cable having two conductors each of which has one end connected to a different side of said double ended transistor drive circuit; a coupling circuit having two sides each of which is connected to a different one of said cable conductors at another end thereof; said coupling circuit including a transformer having a primary winding for each side and a secondary winding, a separate compensating circuit for each side, and a common return lead connecting said coupling circuit to said transistor drive circuit; each of said compensating circuits being connected in series with a different one of said primary windings; each of said compensating circuits including a resistor and a capacitor connected in parallel, said resistor in each of said compensating circuits having a value substantially equal to one-half of the characteristic impedance of said connecting cable, said capacitor in each of said compensating circuits being of such a value that the time constant of the parallel combination of said capacitor and said resistor in each of said compensating circuits is substantially equal to the time constant of the circuit across said secondary winding, said circuit across said secondary including in parallel connection a resistor and said recording coil, said last-named resistor being of such value that its impedance in combination with intrinsic losses of said recording coil, as reflected in each of said primary windings is substantially one-half of the characteristic impedance of said connecting cable, whereby the effective impedance of each side of said coupling circuit between said other end of each of said wires of said cable and said common return lead appears resistive and of value substantially equal to said impedance of said connecting cable at all frequencies.

References Cited by the Examiner

UNITED STATES PATENTS

| | | | |
|---|---|---|---|
| 2,223,736 | 12/40 | Mertz | 333—32 |
| 2,636,149 | 4/53 | Graham | 330—122 |
| 2,734,186 | 2/56 | Williams | 340—174.1 |
| 2,891,236 | 6/59 | Eisenberg | 346—74 |

IRVING L. SRAGOW, *Primary Examiner.*